United States Patent [19]

Johnsen

[11] Patent Number: 5,055,052

[45] Date of Patent: Oct. 8, 1991

[54] MODEL FOR PRACTICING ARTIFICIAL RESPIRATION AND A SIMULATED RESPIRATORY TRACT

[75] Inventor: Malvin Johnsen, Stavanger, Norway

[73] Assignee: Laerdal Medical, Stavanger, Norway

[21] Appl. No.: 519,881

[22] Filed: May 7, 1990

[30] Foreign Application Priority Data

May 11, 1989 [EP] European Pat. Off. ...... 89-108.471.7

[51] Int. Cl.$^5$ .............................................. G09B 9/00
[52] U.S. Cl. .................................. 434/265; 434/267; 128/28
[58] Field of Search ............... 434/265, 262, 267, 272; 128/28, 30, 30.2

[56] References Cited

U.S. PATENT DOCUMENTS

| | | | |
|---|---|---|---|
| 4,001,950 | 1/1977 | Blumensaadt | 434/265 |
| 4,619,617 | 10/1986 | Rice | 434/265 |
| 4,801,268 | 1/1989 | Kohnke | 434/265 |
| 4,802,857 | 2/1989 | Laughlin | 434/265 |
| 4,984,987 | 1/1991 | Brault et al. | 434/265 |

FOREIGN PATENT DOCUMENTS

| | | | |
|---|---|---|---|
| 681469 | 3/1964 | Canada | 434/265 |
| 306328 | 3/1989 | European Pat. Off. | 434/265 |
| 934755 | 8/1963 | United Kingdom | 434/265 |

Primary Examiner—Richard J. Apley
Assistant Examiner—Rachel M. Healey
Attorney, Agent, or Firm—Henry M. Feiereisen

[57] ABSTRACT

In a model for practicing artifical respiration by means of a mouth-to-mouth or mouth-to-nose resuscitation procedure, at least a part of the respiratory tract of the model is simulated by a plurality of successively disposed balloons which are each separably connected by their inflation connection to the closed end of the respective preceding balloon in interconnected relationship to form a continuous flat strip. The strip is wound to form a coil, with the coil being mounted rotatably in the model. In that way a plurality of such balloons are disposed in a coil and replacement of a used balloon by a fresh balloon is affected by pulling the used balloon out of the mouth or nose opening of the model and separating it from the adjoining balloon in the strip of balloons.

19 Claims, 4 Drawing Sheets

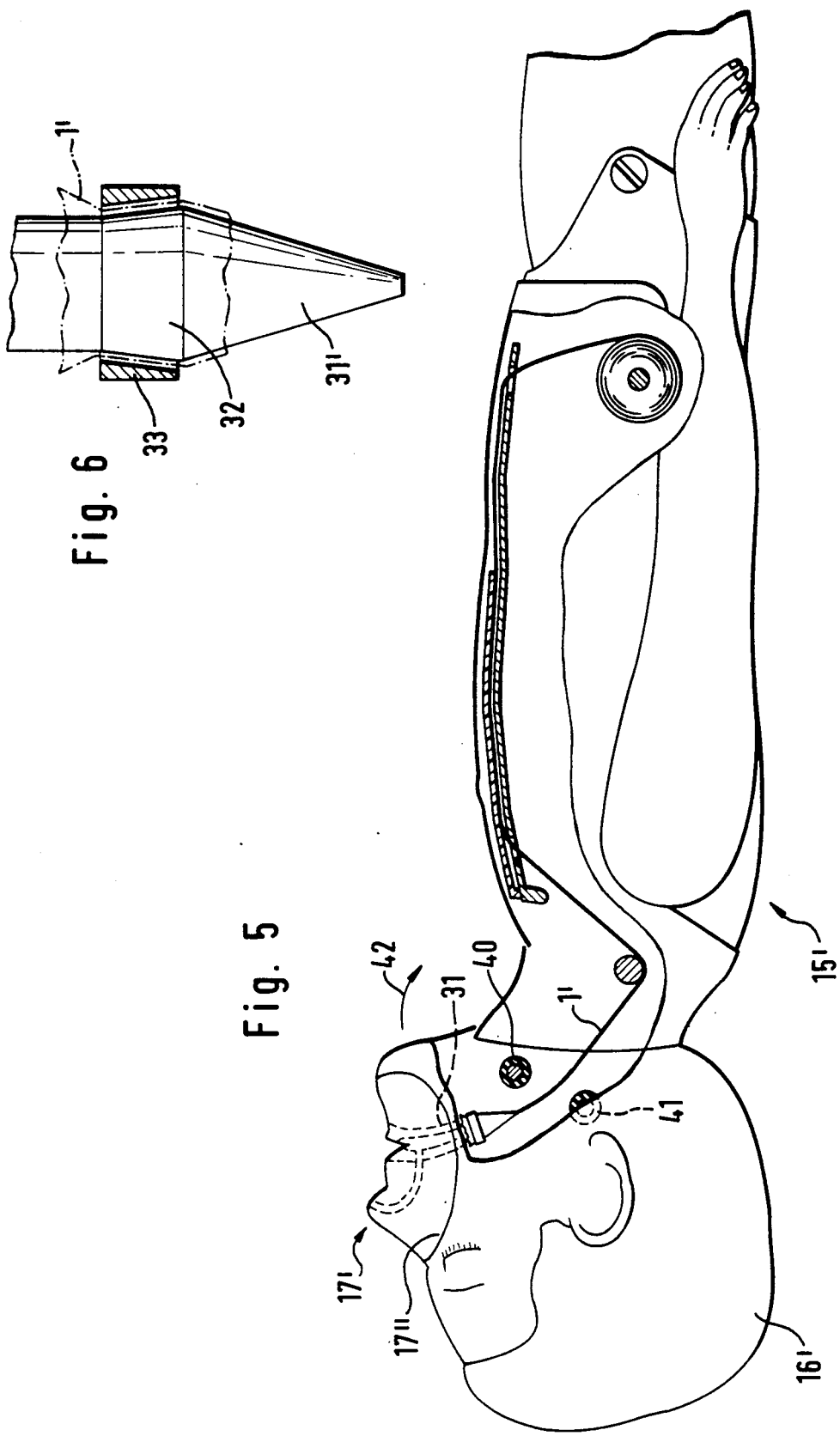

MODEL FOR PRACTICING ARTIFICIAL RESPIRATION AND A SIMULATED RESPIRATORY TRACT

FIELD OF THE INVENTION

This invention relates to a model for practising artificial respiration by means of the mouth-to-mouth or mouth-to-nose resuscitation procedure, and an arrangement for simulating at least a part or the whole of the respiratory tract for a model of that nature.

In this specification, for the sake of convenience and brevity, the term mouth-type resuscitation procedure will be used to denote the mouth-to-mouth procedure, the mouth-to-nose procedure and a procedure involving use of both the mouth and the nose of the patient to be resuscitated.

BACKGROUND OF THE INVENTION

U.S. Pat. No. 4,001,950 discloses a model for practising artificial respiration using the mouth-type resuscitation procedure, comprising a structure simulating at least the head, thorax and the lungs of a human being. The respiratory tract including the lungs is formed by a bag which is disposed within the thorax and which can be inflated against a resilient resistance. The bag is connected to the hollow cavity in the head by way of a duct which simulates the trachea. The part of the head structure which contains the mouth and/or nose openings is releasably connected to the remainder of the head and includes a connecting device for an inflatable balloon disposed in the interior of the head. A person using the model for practice purposes can inflate the balloon through the mouth/nose opening whereby air in the interior of the head is displaced into the simulated lungs, thereby simulating artificial respiration of a human being.

An important advantage of that arrangement is that the part of the respiratory tract which extends from the mouth/nose opening to the simulated lungs and which comes into contact with the exhaled air of the person practising the procedure and thus with the mouth of that person is replaceable. That therefore eliminates the risk of another person who subsequently uses the model for artificial respiration practice purposes suffering from infection due to viruses or bacteria which have remained on or in the model from the previous person using the model, because the replaceable part of the respiratory tract, namely the balloon, can be replaced, together with the mouth/nose part of the model. It is possibly only the balloon that is removed and thrown away because the mouth/nose portion can be cleaned and disinfected.

That model suffers from the disadvantage that it is relatively expensive to use for although the level of requirements made in respect of the replaceable balloon, from the point of view of the mechanical properties thereof, is low, the interior thereof must be physiologically satisfactorily clean and most preferably sterile as in the course of practising artificial respiration the content thereof will have a tendency to flow back to the person using the model for practising purposes, and can thus contaminate the mouth of that person. In particular however the mouth/nose portion of the model must comprise a physiologically acceptable material and must be sterile prior to use of the model. In addition it must be such that it can be air-tightly fitted into the head of the model, and that requires that part of the model to be of a precisely defined shape and to exhibit sufficient mechanical strength because otherwise the air which is displaced in the interior of the head by virtue of the balloon being inflated is not urged in its entirety into the simulated lungs but can escape from the head and thereby result in a false picture of the artificial respiration process. Those requirements in regard to the degree of precision in the shaping of the model and in regard to the quality of the material used as well as satisfactory fitting of the mouth/nose portion in the head of the model in conjunction with the balloons to be used therein increase the costs involved beyond a level which is generally considered to be acceptable for disposable components. If in addition consideration is given to the need for storage of adequate amounts of balloons as well as the replacement time required for replacing a used balloon by a fresh balloon, the result, as mentioned above, is a comparatively high level of overall costs which mean that instruction and practice in the mouth-type resuscitation procedure become an expensive matter.

SUMMARY OF THE INVENTION

An object of the present invention is to propose a model for practising artificial respiration by means of the mouth-type resuscitation procedure, in which the overall costs of the model are lower than those of the previous model without however adversely affecting the safeguards against infection on the part of the person using the model for practising purposes.

Another object of the present invention is to provide a model for practising artificial respiration using the mouth-type resuscitation procedure which affords reliable protection from infection of the person using the model while also being such that a succession of persons can use the model for practice purposes, quickly and conveniently without major delays from one person to another.

Still another object of the present invention is to provide an arrangement for simulating at least part of the respiratory tract of a model for practising artificial respiration, which is quick and inexpensive to use, while affording a sound protection from viral and bacterial infection.

In accordance with the invention, these and other objects are achieved by a model for practising artificial respiration using the mouth-type resuscitation procedure, comprising portions simulating the head, thorax and lungs of a human being. At least a part of the respiratory tract of the model is formed by an inflatable balloon which is disposed in the interior of the model and which can be connected by way of an inflation connection of the balloon to the mouth and/or nose opening of the head of the model, thereby to be inflated through the opening. A plurality of such balloons are each separably connected in succession by their respective inflation connection to the closed end of the respective preceding balloon in interconnected relationship to form a continuous strip which is wound to form a coil mounted rotatably in the model.

The invention therefore proposes that a plurality of inflatable balloons, each of which is adapted to represent at least a part of the respiratory tract of the model, are wound in a continuous strip in a flat condition to form a coil or roll which can thus be mounted rotatably in the interior of the model. The fact that the strip of interconnected balloons can be wound into a roll, with the balloons in a flat condition, means that a very large number of such balloons can be disposed in an extremely compact fashion as a single roll, with the risk of contamination being excluded, even over a prolonged period of time, by virtue of the pressure applied to the respective balloons as a result of being wound in a roll, with the layers forming the roll bearing tightly against each other. As the coil or roll formed from the strip of balloons is also disposed in the interior of the model, there is no need to provide for a separate stock of balloons outside the model, thus saving on storage space and consequently reducing the level of operating costs of the model. The individual balloons in the strip are each connected to the preceding balloon in the direction in which the strip is unwound from the roll or coil, and can be separated therefrom.

In accordance with a particularly advantageous embodiment of the invention the inflation connection of each balloon, starting from its free edge, has two mutually oppositely disposed slots or separating lines which extend in the longitudinal direction of the strip and which, together with the end edge of the inflation connection, define mutually oppositely disposed wall portions of the inflation connection. After the inflation connection has been passed through the mouth opening in the head of the model, so as to be on the outside surface of the head, the above-mentioned wall portions, possibly after being torn open along the above-mentioned separating lines, can be folded over on to the parts of the face of the head, which adjoin the mouth and/or nose opening. In that way the folded-over wall portions of the inflation connection cover the parts of the face of the model which adjoin the mouth and/or nose opening and thereby form satisfactory protection for the person using the model, from coming into contact with those parts of the face of the model. That construction therefore makes it possible for the part of the head of the model which includes the mouth and nose opening to be a fixed part of the head, that is to say, there is no longer any need for that part of the head of the model to be a replaceable component, which in turn results in a considerable reduction in the level of costs involved.

In accordance with a further feature of the invention, each balloon not only forms a part of the respiratory tract of the model but is also reduced in size adjoining the inflation connection to provide a simulated trachea and is then enlarged again adjoining the simulated trachea to provide a chamber which simulates the lungs and which is closed at its end remote from the simulated trachea. That configuration means that there is no need to provide a separate simulated lungs arrangement which can be inflated against a resilient resistance, in the interior of the model, so that the interior of the head does not have to be air-tightly sealed off relative to the exterior of the model.

It will be apparent that the operation of replacing a used balloon is a simple matter. When a person using the model for practice purposes has finished his practice procedure on the model, the instructor only needs to grip the wall portions of the inflation connection, which are disposed outside the mouth or nose opening as referred to above, and then pull the balloon out of the interior of the model until the wall portions of the inflation connection of the next following balloon in the strip appear through the mouth or nose opening of the model. Thereupon the balloon which has been pulled out of the model can be separated from the next following balloon by cutting it off. Alternatively, a separating line may be provided between the two adjacent balloons as by means of perforations or a pre-embossed line at an appropriate location, so that the used balloon can be torn away from the next following balloon along the separation line. The above-mentioned wall portions of the inflation connection are then in turn laid over on to the parts of the face of the model adjoining the mouth or nose opening, so that the model is then ready for use by the next person to practice the resuscitation procedure. As the resuscitation air of the previous person practising with the model came into contact only with the interior of the balloon which has now been pulled out of the model and thrown away and as the mouth of that person only ever came into contact with the folded-over wall portions of the inflation connection of the discarded balloon and not with the parts of the face of the model which were covered by those wall portions, there is no risk of infection from the point of view of the next person to use the model.

Even if, in accordance with a further embodiment of the invention, the model has a replaceable mouth/nose portion having a connecting device for the inflation connection of the respective balloon, the overall costs of use of the model can be kept at an acceptably low level by each balloon simulating the respiratory tract as far as the lungs arrangement, in the manner referred to above. In that case, the mouth/nose portion of the model does not need to be air-tightly connected to the corresponding opening in the head of the model, so that the level of requirements in regard to the precision with which the model is shaped, and the mechanical properties of the material for making the mouth/nose portion, can be at a low level with the result that the mouth/nose portion can be produced inexpensively.

The continuous web or strip which is made up of the interconnected balloons can be formed from a tubular foil or a double foil layer arrangement. The individual balloons in the strip may be produced directly when making the tubular foil or the double foil layer arrangement, for example upon extrusion thereof. Thus for example when a tubular foil is produced by extrusion, the procedure may include an operation for intermittently welding the tube while in a flattened condition, in a configuration corresponding to the contour of each balloon, at the sides thereof and in transversely extending relationship at the locations which are subsequently to form the edges of the balloon, with the residual pieces of tubular foil which remain at the side edges of the welded balloon configuration outside same being removed as by cutting or stamping, and discarded. In a similar fashion, it would also be possible to form the required weakening or separating lines, downstream of the transverse welded seam which forms the closed end of the balloon, the weakening or separating lines subsequently forming the free edge of the inflation connection of a respective balloon after separation thereof from the respectively preceding balloon. If the balloon is of such a configuration as to form only a part of the respiratory tract, for example it only extends into the interior of the head of the model, then what is required at most in the region of the inflation connection of the balloon is for the tubular foil to be welded and simultaneously cut at the side, while in other respects the side edges of the flattened tube also form the boundary edges or lines of the balloon.

The material for the balloons can be any physiologically acceptable thermoplastic material such as for example PVC, polyethylene, polyurethane and the like. Immediately after the procedure for producing the strip of balloons, the strip can be wound up to form a roll or coil containing a large number of balloons so that the sterile condition of the balloons, due to the temperature involved in extrusion of the tubular foil, is maintained when the balloons are wound into the roll or coil. It is desirable for the roll or coil to be used with a suitable spindle or shaft which can be readily fitted into suitable mounting means disposed within the model.

Further objects, features and advantages of the present invention will be apparent from the following description of preferred embodiments of the invention.

BRIEF DESCRIPTION OF THE DRAWINGS

FIG. 5 is a view similar to that shown in FIG. 3 illustrating another embodiment of the model having a mouth/nose portion which is replaceable, and FIG. 6 is a partly sectional view of part of a connecting device for the inflation connection of a balloon for connecting it to the mouth/nose portion of FIG. 5.

DESCRIPTION OF PREFERRED EMBODIMENTS

Figure 1:
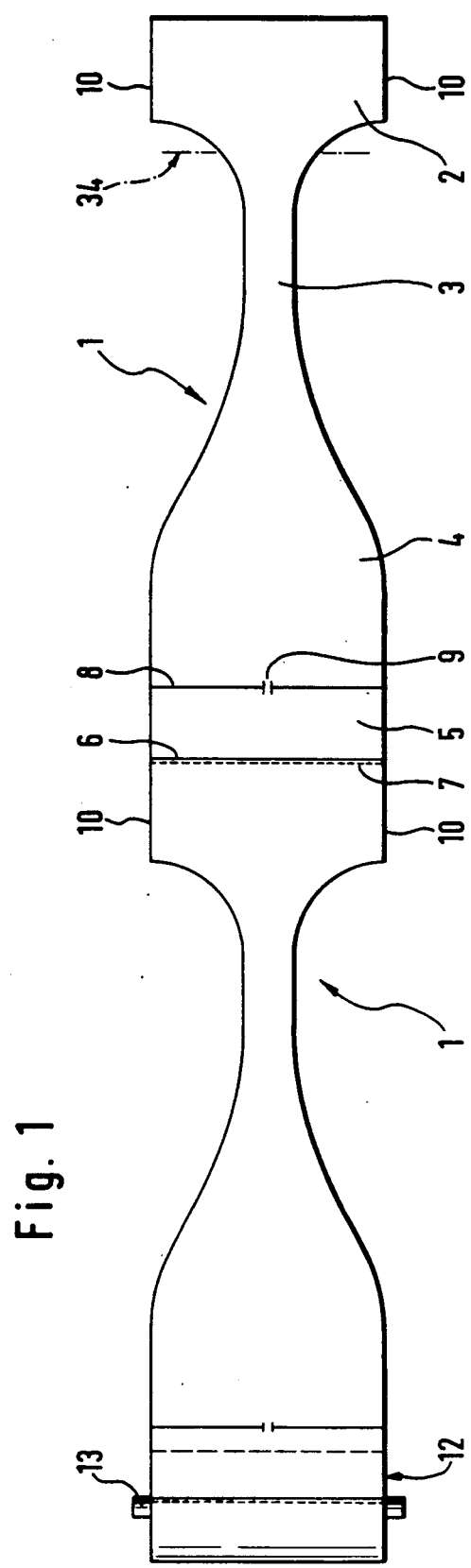
FIG. 1 is a diagrammatic view of a strip of balloons which is wound into a roll or coil and from which two balloons have already been unwound.
Figure 2:
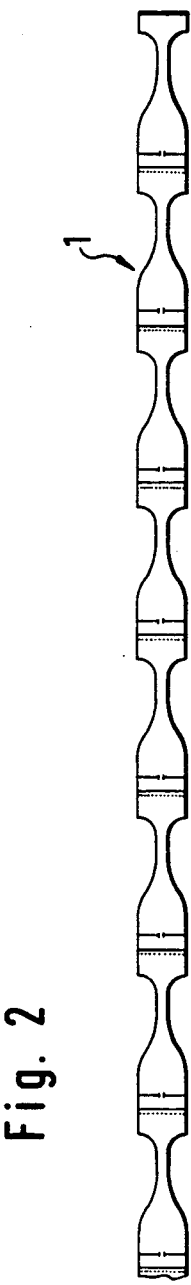
FIG. 2 is a view on a considerably smaller scale than FIG. 1, showing part of a continuous strip of balloons in an unwound condition.

Referring firstly to FIGS. 1 and 2, shown therein are parts of a strip formed by interconnected balloons which are generally indicated by reference numeral 1. Each of the balloons 1 forms the entire respiratory tract within the models shown in FIGS. 3 through 5. In the form illustrated in FIGS. 1 and 2, the balloons 1 form a strip in a flattened condition and each comprise an inflation connection 2, a simulated trachea 3 adjoining same, with the width of the simulated trachea 3 being considerably reduced in comparison with that of the inflation connection 2, a chamber 4 which, starting from the simulated trachea 3, increases in width again to simulate the lungs, and a further chamber 5 which adjoins the chamber 4 and which simulates the stomach. The chamber 5 is sealingly closed relative to the next following balloon 1 by a transverse welded seam 6 while extending parallel to the transverse welded seam 6 and directly adjacent thereto is a perforated line 7 which forms a weakening or separating line and which permits the two balloons shown in FIG. 1 to be easily separated from each other by tearing. The lungs-simulating chamber 4 is separated from the stomach-simulating chamber 5 by a transversely extending welded seam 8, except for a short interruption indicated at 9 in the welded seam 8. The interruption 9 forms a throttle opening through which respiratory air can slowly pass into the stomach-simulating chamber 5 when the lungs-simulating chamber 4 is inflated.

The two oppositely disposed side edges 10 of the inflation connection 2 of each balloon 1 are open, that is to say, the inflation connection 2 of each balloon 1 is slit over its length from the perforated line 7 representing the line for separation of that balloon 1 from the preceding balloon 1, as far as the point at which the transition to the simulated trachea 3 begins.

The continuous strip consisting of nothing but balloons 1 is wound to form a roll or coil which is indicated at 12 in FIG. 1, carried on a shaft or spindle as indicated at 13.

Figure 3:
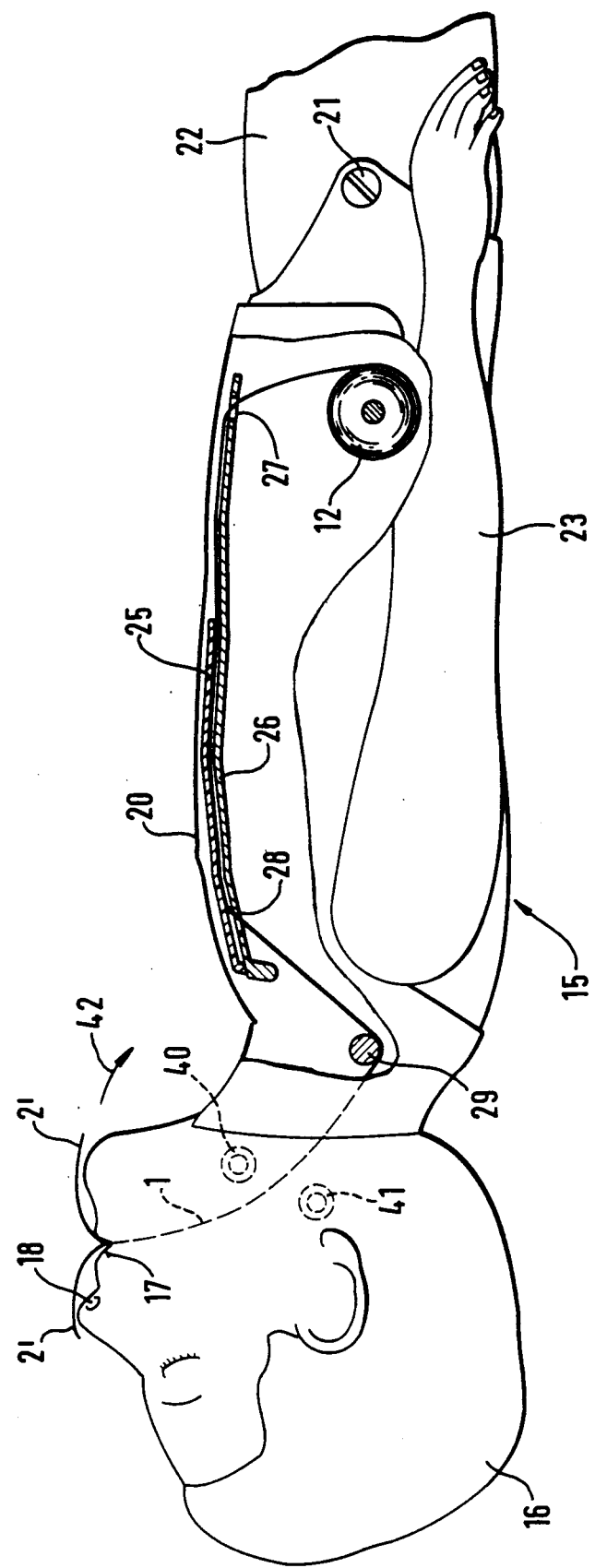
FIG. 3 is a side view of a model for practising artificial respiration, diagrammatically illustrating the arrangement of the strip of balloons within the model and the path followed by same.
Figure 4:
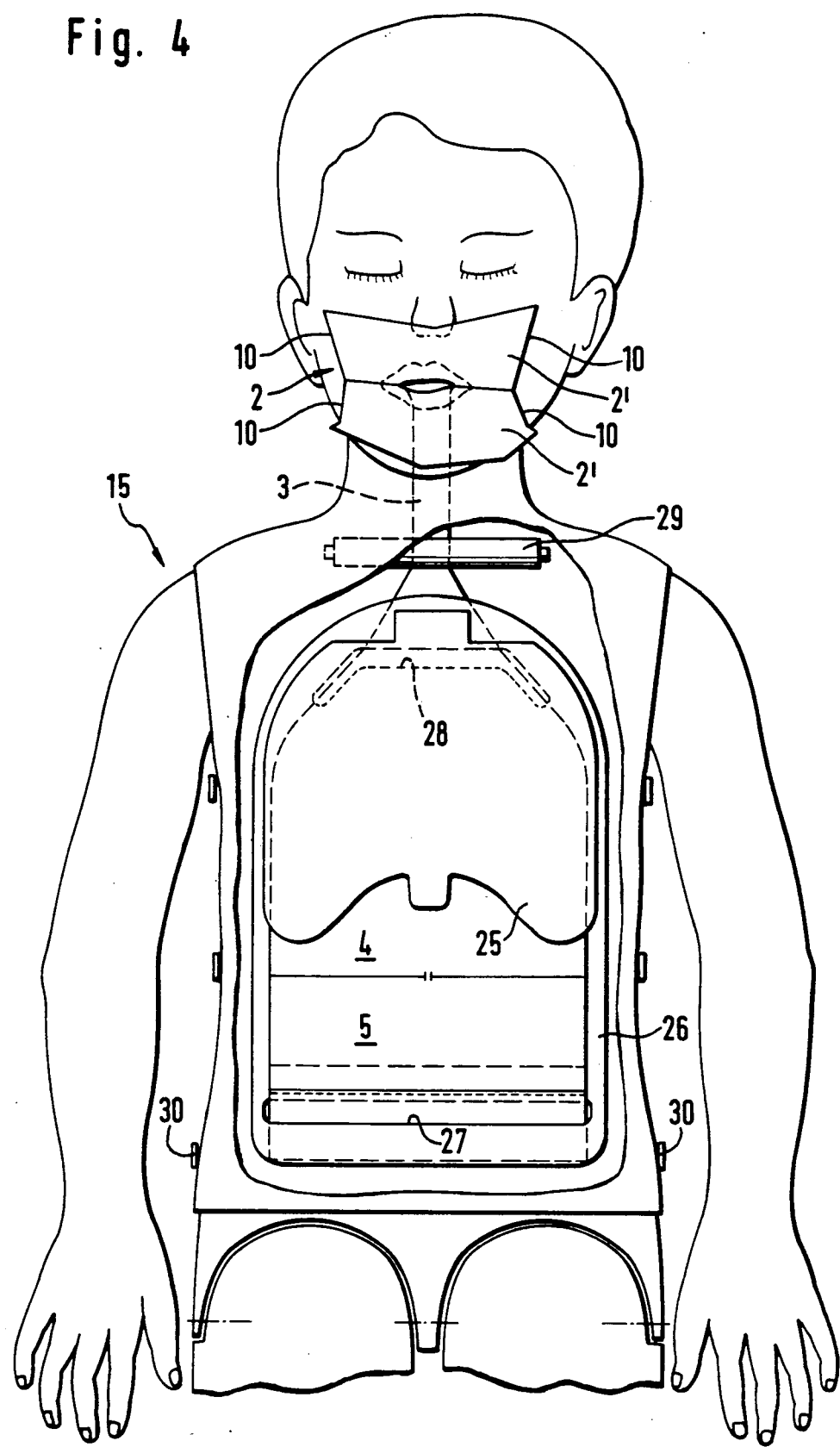
FIG. 4 is a plan view of the model shown in FIG. 3.

Referring now additionally to FIGS. 3 and 4, the coil 12 is mounted in the hollow interior of the model which is generally identified by reference numeral 15, in such a way that the spindle or shaft 13 can rotate in its mountings whereby the strip of balloons 1 can be unwound therefrom. The mounting arrangement is not shown in detail in the drawings as it will be apparent to the man skilled in the art. In the illustrated embodiment, as shown in FIGS. 3 and 4, the model 15 includes a portion simulating a head 16 with a mouth opening 17 and a nose opening 18, a portion simulating the thorax 20 which is connected by means of a hinge 21 to legs 22, and arms 23. The structure of and the material used for the individual parts of the model 15 as illustrated are of generally conventional nature and do not form part of the present invention so that they will not be described in greater detail herein.

Disposed in the interior of the model 15, beneath the upper wall of the thorax 20, is a rib plate 25 which simulates the ribs of a human being while extending beneath the rib plate 25 is a guide plate 26 which extends substantially from the end of the rib plate 25 which is towards the head 16 of the model 15, beyond the end of the rib plate 25 which is towards the abdomen of the model, to a position above the coil or roll as indicated at 12. At a position relatively accurately disposed above the coil 12 the guide plate 26 has a transversely extending slot 27. The edge of the guide plate 26 which is towards the head 16 of the model 15 is of a semicircular configuration and disposed in the vicinity thereof is a further transversely extending slot 28 which, as can be clearly seen from FIG. 4, is bent over at both ends at an angle of about 45° towards the abdomen of the model.

The rib plate 25 and the guide plate 26 form between them a guide gap through which passes the strip of interconnected balloons 1 as the strip is unwound from the coil 12. Thus, the strip of balloons 1 extends upwardly from the coil 12 through the slot 27 in the guide plate 26, passes in the lengthwise direction through the guide gap formed between the plates 25 and 26, then extends downwardly through the slot 28, is passed around a guide roller 29 mounted rotatably in the neck region of the model 15 and finally is drawn outwardly of the model 15 through the mouth opening 17 until the entire inflation connection 2 of the respective balloon 1 is outside the head 16. As can be seen from FIGS. 3 and 4, the wall portions 2' of the inflation connection 2 are separated from each other along the slit edges 10 and are folded or laid over on to the parts of the face of the head 10, which adjoin the mouth opening 17. In that way, over those parts of the face of the head 16 they form a continuous surface which is formed by the initially inwardly facing faces of the wall portions 2' and which at its center includes the opening leading to the simulated trachea 3 formed by the balloon 1. As can be seen from FIG. 4, the width and the length of the inflation connection 2 of each balloon 1 are such that a sufficiently large part of the face of the head 16 of the model can be covered thereby and there is no risk of parts of the face adjoining the mouth opening 17 coming into direct contact with the mouth of a person using the model for practice purposes.

The rib plate 25 comprises a resiliently flexible material, for example an elastomer. When, during the resuscitation procedure, the lungs-simulating chamber 4 which is disposed between the rib plate 25 and the guide plate 26 is inflated, the rib plate 25 can deform upwardly in FIG. 3 in a manner which corresponds to the natural breathing movement of a human being. The guide plate 26 may comprise a stiff material so that the inflation movement of the lungs-simulating chamber 4 corresponding to the breathing movement is transmitted in its entirety to the rib plate 25, rather than also deforming the guide plate 26.

In order to prepare the model 15 for practising the artificial respiration procedure, a coil or roll 12 is firstly fitted into the mounting arrangement (not shown) disposed in the thorax 20. The mounting arrangement is accessible after releasing fixing elements indicated at 30 in FIG. 4 and lifting away the upper part of the thorax 20 structure. The leading end of the first balloon 1 of the roll 12 is then pulled through the slot 27 and threaded through the guide gap between the rib plate 25 and the guide plate 26 (which is possible after the rib plate 25 has been moved upwardly, making use of the resiliency thereof), passed through the slot 28 at the head end of the guide plate 25 and finally passed around the guide roller 29. The leading end of the balloon 1 is lastly passed outwardly through the mouth opening 17 from the space within the head 16 of the model, which is accessible through the head connection. From that time on, a plurality of further balloons 1 can be unwound from the coil 12 and moved into the correct position in the interior of the model 15 simply by pulling on the part of the first balloon 1 which is outside the mouth opening 17. The length of each balloon 1 is so adapted to the dimensions of the model 15 that, after the inflation connection 2 has been pulled out of the mouth opening 17 of the model, the lungs-simulating chamber 4 is disposed in the guide gap between the rib plate 25 and the guide plate 26 while the stomach-simulating chamber 5 is disposed outside the guide gap, at a position towards the abdomen, as can be clearly seen from FIG. 4. In a practical construction of the balloon 1 it is of an overall length of 50 cm, the width of the inflation connection 2 is 15 cm, the width of the simulated trachea 3 is 3.5 cm and the width of the lungs-simulating chamber 4 and the stomach-simulating chamber 5 is about 15 cm. The distance in the longitudinal direction between the welded seams 6 and 8 which define the stomach chamber 5 is about 5.5 cm while the interruption 9 forming the throttle opening between the chambers 4 and 5 in the welded seam 8 is about 0.7 cm in length.

Referring now to FIG. 5, the general structure of the model 15' shown therein, with the exception of the configuration of the mouth/nose portion 17', is identical to the above-described model 15 so that there is no need for further description thereof. In the FIG. 5 embodiment the mouth/nose portion 17' is releasably arranged in a correspondingly shaped recess 17" in the head 16'. There is no need for the mouth/nose portion 17' to be fixed in position at the edge of the opening 17" to prevent it from being lifted away upwardly as shown in FIG. 5, and also there is no need for a seal between the edge of the opening 17" and the mouth/nose portion 17'. The mouth/nose portion 17' only needs to be supported on the edge of the opening 17" so that, when the person using the model for practice purposes carries out a practice resuscitation procedure, the mouth/nose portion 17' is only pressed downwardly by the person using the model.

Extending from the mouth opening, the mouth/nose portion 17' comprises a tubular projection 31 which, in the mounted position of the mouth/nose portion 17' as illustrated in FIG. 5, is directed towards the interior of the head 16' and which tapers in an end portion 31' as shown in FIG. 6. Disposed in front of the tapered portion 31' is a portion 32 whose outside surface is of a tapering configuration opposite to that of the tapered end portion 31', as can be clearly seen from FIG. 6. The outside surface of the portion 32 is tapered at a slight angle relative to the longitudinal axis of the projection 31. Associated with the portion 32 is a clamping ring 33, the inside surface of which is of a complementary conical configuration relative to the outside surface of the portion 32 and is disposed at a certain clearance therefrom.

The balloons used in the model 15' differ from those used in the model 15 solely insofar as they only have a short inflation connection upstream of the simulated trachea 3. Reference numeral 34 in FIG. 1 indicates the position of the free edge of the inflation connection, as shown in dash-dotted lines. When the mouth/nose portion 17' has been removed from the model 15', the shortened inflation connection is gripped, fitted on to the conical portion 31' of the projection 31 and pushed thereonto to a position beyond the portion 32. At that time the clamping ring 33 is pushed back still further. The clamping ring 33 is then fitted over the inflation connection and axially pressed firmly against the outside surface of the portion 32 so that the inflation connection is air-tightly clamped fast to the projection 31. The slight angle at which the portion 32 flares outwardly in a tapered configuration provides the necessary self-locking action which prevents the clamping ring 33 from unintentionally moving away from the portion 31', that is to say upwardly in FIG. 6.

A used balloon is replaced by a fresh balloon in a similar manner to that described above with reference to FIGS. 1 through 4, in the following fashion:

The mouth/nose portion 17' is removed from the opening 17' and the used balloon is made accessible through that opening. The used balloon can be withdrawn from the projection 31 after pushing the clamping ring 33 back on the projection 31. Thereupon, by further pulling the used balloon out of the opening 17', the inflation connection of the next following balloon can be pulled into a position in which it can be gripped so that the fresh balloon can be joined in the above-described manner to a fresh mouth/nose portion 17' or alternatively it can be joined to the mouth/nose portion which has already been previously used, after it has been cleaned and disinfected.

Both the above-described embodiments, namely that described with reference to FIGS. 1 through 4 and that described with reference to FIGS. 5 and 6, include a means for preventing artificial respiration if the head 16 or 16' of the model is not in the rearwardly tilted position required for correct resuscitation. In artificial respiration the head of the patient must be in such a position, with the chin clearly lifted, in order for the respiration air which is blown in through the mouth/nose openings actually to be able to flow through the trachea and pass into the lungs.

For that purpse, in the embodiments described herein the head 16 or 16' is pivotable about an axis which is perpendicular to the plane of the drawing in FIGS. 3 and 5 and which coincides with the axis of the guide roller 29. Details of that pivotal mounting are not shown because it is of generally conventional construction. In accordance with the invention however a squeeze roller 40 is mounted rotatably or non-rotatably in the neck connection of the thorax 20, parallel to the guide roller 29. Another squeeze roller 41 of a corresponding configuration and with a corresponding mounting arrangement is disposed in the head 16 or 16' and is consequently movable together therewith, towards and away from the first-mentioned squeeze roller 40. In the rearwardly tilted position of the head 16 or 16' as shown in FIGS. 3 and 5 respectively, the simulated trachea 3 extends freely through the space between the two squeeze rollers 40 and 41 so that air can be unimpededly blown into the simulated trachea and lungs arrangement. If however the head 16 or 16' is in a position in which the chin is pressed towards the chest in the direction indicated by the arrow 42 in FIG. 3 and FIG. 5, then the squeeze roller 41 is in close proximity to the squeeze roller 40 so as to clamp the simulated trachea 3 therebetween, so that it is not possible for air to be blown into the lungs-simulating chamber 4. That head posture corresponds to that natural head posture of a person, in which the trachea is obstructed by virtue of being compressed. The person using the model for practising artificial respiration can immediately notice that described head posture which is useless for artificial respiration as, as a result of the absence of inflation of the lungs-simulating chamber 4, it is not possible to feel the above-described lifting or expansion movement of the rib plate 25, which also corresponds to the natural reaction of a patient to be subjected to artificial respiration. The person using the model can then correct the head posture.

As in a human being the air passage through the trachea is opened even when the chin is emphatically lifted, which is normally also due to a pivotal movement of the head, then instead of the head 16 or 16' being pivotable or in addition thereto, the chin may be arranged movably with one of the squeeze rollers, for example the squeeze roller 41, being mounted in the movable chin. In that way when the chin is lifted the squeeze roller 41 can be brought into contact with the squeeze roller 40 so that the simulated trachea is squeezed therebetween and thus closed off.

The squeeze rollers 40 and 41 may be covered on their circumference with a yielding or flexible layer, for example of elastomeric synthetic material, in order on the one hand to simulate the natural characteristics of the interior of the neck of a human being, while on the other hand at any event avoiding damage to the simulated trachea 3.

It will be appreciated that the coil 12 is mounted rotatably in the interior of the head if for example the balloons each only simulate a part of the respiratory tract without lungs and trachea, with those components being fixedly installed in the model.

As in the above-described embodiments the upper cover portion of the thorax can be lifted off to permit fitting of a coil 12 after release of the fixing elements 30, the interior of the model including the plates 25 and 26, the guide roller 29 and the squeeze rollers 40 and 41 are readily accessible for cleaning purposes. That is a matter of considerable advantage if due to one of the balloons 1 being inflated to an excessive degree that balloon is damaged, for example split, and respiration air and possibly even saliva, passes into the interior of the model through the damage or split.

It will be appreciated that the above-described constructions have been set forth solely by way of example and illustration of the principles of the present invention and that various other modifications and alterations may be made therein without thereby departing from the spirit and scope of the invention.

What is claimed is:

1. A model for practising artificial respiration by means of a mouth-type resuscitation procedure, comprising portions respectively simulating the head having a breathing opening, and the thorax of a human being, a plurality of inflatable balloons each adapted to constitute at least a part of the respiratory tract of the model and each having a first end providing an inflation connection for inflating the balloon through said breathing opening of the head, and a second closed end, the balloons being disposed in succession and each separably connected by way of their respective inflation connection to the second end of the preceding balloon in the succession thereby to form a continuous flat strip which is wound to form a coil, and means for rotatably mounting the coil in the model.

2. A model as set forth in claim 1 wherein the inflation connection of each balloon comprises two wall portions disposed adjacent to and coextensive with each other and which are adapted to be folded over on to parts of the face of said head which adjoin the breathing opening thereof.

3. A model as set forth in claim 1 wherein each balloon is reduced adjoining the inflation connection thereof to provide a simulated trachea and is enlarged again adjoining said simulated trachea to provide a chamber simulating the lungs.

4. A model as set forth in claim 3 wherein adjoining said lungs-simulating chamber is a further chamber which simulates the stomach, and further including a throttle opening providing a restricted communication from the lungs-simulating chamber to the stomach-simulating chamber.

5. A model as set forth in claim 1 wherein said mounting means for replaceably mounting a said coil is disposed at the end of the thorax which is towards the abdomen.

6. A model as set forth in claim 1 wherein the thorax includes a rib plate simulating the ribs of the thorax and a guide plate disposed inwardly of said rib plate relative to the thorax, the rib plate and the guide plate being spaced apart to define therebetween a guide gap for guiding said strip in a flattened condition between said plates.

7. A model as set forth in claim 6 wherein the guide plate in the vicinity of its edge towards the abdomen has a transversely extending slot through which the strip is adapted to pass, and further including guide roller for guiding the strip beneath the plane of said guide gap in the neck region of the model.

8. A model as set forth in claim 6 wherein said rib plate is elastically deformable.

9. A model as set forth in claim 6 wherein said rib plate is adapted to be lifted away from said guide plate against a resilient resistance.

10. A model as set forth in claim 1 wherein said breathing opening is formed in a face portion of the head arranged replaceably in the head, said face portion having a connecting means projecting into the interior of the head for connection to a respective balloon for inflation thereof.

11. A model as set forth in claim 10 wherein said connecting means includes a clamping ring for sealingly clamping the inflation connection of a respective balloon to the connecting means.

12. A model as set forth in claim 1 and further including a neck projection on the thorax, which projects into the head, a first squeeze roller carried on the neck projection, a second squeeze roller disposed in the head parallel to the first squeeze roller, the simulated trachea passing between the squeeze rollers, and means for pivotal movement of the head relative to the neck projection forwardly into a trachea-obstruction position in which the squeeze rollers clamp the simulated trachea between them to close off the simulated trachea and rearwardly into a trachea-freeing position in which the squeeze rollers are separated from each other.

13. A model as set forth in claim 12 wherein the peripheral surfaces of the squeeze rollers are covered with a yielding material.

14. A continuous strip of interconnected inflatable balloons for use as simulation of at least a part of the respiratory tract in a model for practising artificial respiration by the mouth-type resuscitation procedure wherein the strip of balloons is in flat condition and is wound to form a coil and wherein each balloon has an inflation connection and a closed end and, with the exception of the balloon forming the leading end of the strip, all balloons are respectively separably connected by their respective inflation connection to the closed end of the respective balloon which is towards the leading end of the strip wherein each balloon has a constricted trachea-simulating portion adjoining the inflation connection and a lungs-simulating portion which adjoins the trachea-simulating portion, said lungs-simulating portion being enlarged relative to the trachea-simulating portion, and further including a stomach simulating portion which is enlarged relative to the trachea-simulating portion and adjoins the lungs-simulating portion, and a throttle opening providing a restricted communication between the lungs-simulating portion and the stomach simulating-portion.

15. A strip as set forth in claim 14 comprising a tubular foil of thermoplastic material in a flattened condition and wherein the closed end of each balloon is formed by a first transverse welded seam on the tubular foil.

16. A strip as set forth in claim 15 wherein the stomach-simulating portion is produced by a further transverse welded seam disposed at a spacing from the first transverse welded seam, the second transverse welded seam having an interruption forming the throttle opening.

17. A strip as set forth in claim 16 including perforations extending directly adjacent each said first transverse welded seam as a separating line, transversely over the entire width of the tubular foil.

18. A strip as set forth in claim 17 and including slots starting from said first transverse welded seam and extending at the oppositely disposed edges of the tubular foil in the longitudinal direction of the strip, the slots defining wall portions of the inflation connection which are adapted to be folded over.

19. A strip as set forth in claim 17 and including separating lines starting from said first transverse welded seam and extending at the oppositely disposed edges of the tubular foil in the longitudinal direction of the strip, the separating lines being adapted to define wall portions of the inflation connection which are adapted to be folded over.

* * * * *